Patented Oct. 28, 1952

2,615,812

UNITED STATES PATENT OFFICE 2,615,812

COCONUT

Charles W. Kaufman, Tenafly, and Charles B. de Maya, Allendale, N. J., assignors to General Foods Corporation, New York, N. Y., a corporation of Delaware No Drawing. Application October 12, 1950, Serial No. 189,896

8 Claims. (Cl. 99—125)

This invention relates to coconut and more particularly to prepared or packaged coconut of the type used for bakery, confectionery and household purposes.

In preparing coconut for the above purposes, the manufacturer is confronted with the problem of preparing a tender, palatable product which can be kept for relatively long periods without becoming sour and inedible due to microbiological spoilage. It is known that the rate of such spoilage is dependent on the moisture content of the coconut. Untreated coconut is readily susceptible to spoilage at moisture levels above 5%, but at moisture levels below 5% it is satisfactorily resistant to spoilage for practical purposes. Consequently, a common practice is to dry coconut to a low moisture level, generally about 2%, at which the action of microorganisms does not occur. However, the resulting product is not satisfactory from the consumer's viewpoint, being relatively hard, brittle and lacking in flavor.

Within reasonable limits, the tenderness of coconut increases as its moisture content is increased, and hence various methods have been used to inhibit or prevent microbiological spoilage in order that the coconut can be marketed at a higher moisture level. For example, coconut treated with sugar, salt and glycerine has been marketed at 5% moisture, but this moisture level is still too low to provide a product of high quality. Also similarly treated coconut has been pasteurized in sealed cans and marketed at moisture levels as high as 15%, but this method is unduly expensive for general use. A third method, which permits the use of moisture levels in the range of 5–15% without pasteurization and canning, consists in adding about 2–5% of propylene glycol or butylene glycol to the coconut as disclosed in U. S. Patent No. 2,338,184. While the latter method provides a relatively tender product free from microbiological spoilage, it has been observed that the coconut has a tendency to discolor or yellow within the periods often elapsing in commercial distribution. For instance, coconut having a moisture content of about 8% and treated with commercially obtained propylene glycol has been found to yellow objectionably in some cases after storage for only 2 to 3 months at room temperature.

It is an object of the present invention to prepare coconut having a moisture content of from 5 to 15% which can be marketed in low cost containers without microbiological spoilage and also without yellowing or discoloration.

It is a further object of the invention to prevent the yellowing or discoloration which has heretofore occurred in coconut after treatment with propylene glycol or butylene glycol.

It has now been discovered that the yellowing or discoloration mentioned above is due to the presence of certain carbonyl-containing materials in the propylene glycol or butylene glycol added to the coconut, and that it can be substantially eliminated by separating or effectively removing such carbonyl-containing impurities from the glycols before adding them to the coconut. Commercial grades of propylene glycol and butylene glycol have been found to contain impurities, such as aldehydes and ketones, which contain at least one carbonyl radical, and such aldehydes and ketones constitute the bulk of the carbonyl-containing impurities. However, other impurities are present which have no carbonyl radical in their structures but are precursors of materials which do, as for example acetals and ketals which may act as precursors of aldehydes and ketones. All such impurities, herein referred to inclusively as carbonyl-containing impurities, should be separated or effectively removed from the glycols before adding them to the coconut in order to minimize the danger of yellowing.

The source of the aldehydes, ketones, acetals and ketals found in commercial grades of propylene glycol and butylene glycol is not known exactly. However, it appears that such impurities result from the processing employed in preparing such glycols and/or chemical reactions in which the glycol itself is the starting material. The presence of aldehydes can be accounted for by the oxidation of the glycol either in the process of preparation or on storage. For example, propylene glycol may oxidize to form hydroxypropionaldehyde which may in turn oxidize to pyruvic aldehyde. This latter material may react with itself in the presence of water to form pyruvic acid and acetol, the latter material being a ketone. Chemical analyses of various commercial glycols seem to bear out this explanation, at least insofar as acetol and pyruvic aldehyde are concerned. The presence of the acetals and ketals is attributed to a chemical reaction between the glycol and the aldehydes and ketones, respectively.

The aforesaid carbonyl-containing impurities may be separated or effectively removed from the glycols in any appropriate manner. For example, the propylene glycol or butylene glycol containing the impurities may be subjected to fractional distillation, preferably under reduced pressure of the order of 10 to 80 mm. By taking appropriate cuts or fractions, it is possible to separate a substantial proportion of the impurities, whether their boiling points are lower than or exceed that of the glycol, and thus to obtain a glycol containing a relatively small proportion of such impurities. It has been found that generally the major proportion of impurities found in commercial samples of the glycols have boiling points lower than the glycol and are distilled over in the forerun. In some cases, particularly where there is a relatively high proportion of impurities, distillation and collection of the first 20% fraction has removed 90% of the carbonyl-containing impurities.

If desired, the impurities may be effectively removed by treating the glycol with a strong nonvolatile alkali, such as KOH, NaOH, and the like, preferably at elevated temperatures to shorten the time of treatment. After the alkali treatment, the purified glycol may be separated from the reaction products and any excess alkali in any suitable manner, as by means of a simple distillation which usually can be carried out so as to bring the material to be distilled down to dryness without appreciable amounts of impurities being distilled over with the glycol. If desired, the simple distillation may be carried out under vacuum.

Still another way of effectively removing the aforesaid impurities is by treating the glycol with sulphur dioxide. In this case the impurities are not actually separated from the glycol, but they are effectively removed therefrom by a change in form or nature such that they no longer cause yellowing of the coconut. While the exact mechanism involved is not known, it is believed that the sulphur dioxide and the impurities form a complex that causes little or no yellowing. The sulphur dioxide may be added in any desired manner, but it is generally preferred to bubble sulphur dioxide gas into the glycol until the desired concentration of sulphur dioxide in the glycol is reached. As a rule, the concentration is preferably kept at less than 0.2% sulphur dioxide by weight of the glycol, particularly when the preferred percentage of 2 to 5% glycol by weight is used to treat coconut.

The carbonyl-containing impurities can also be removed in substantial quantities by contacting the glycol with appropriate ion exchange resins such as certain polyamines and polyphenols, or with suitable adsorbing materials such as certain types of alumina, particularly alumina in anhydrous condition.

As a rule the glycol should be used promptly after it has been purified since, as pointed out above, the impurities may result from reactions involving the glycol itself and hence might develop in the purified material on long or rigorous storage. However, the aforementioned reactions proceed only very slowly at normal temperatures and if desired the purified glycol may be kept under careful storage for some time without causing objectionable yellowing of the coconut to which it is then added.

The purified glycol may be added to coconut in any desired way. For example, fresh coconut having a moisture content of 40 to 48% may be subdivided by milling or other suitable means into threads, shreds, particles of various sizes, and the like, depending on its intended use. The prepared coconut may then be mixed with the purified glycol, water, salt, and if desired, sugar, heat being preferably applied to facilitate the mixing operation. For example, the desired ingredients are mixed in a copper, steam-jacketed open kettle which revolves at an angle of approximately 45° from the horizontal. Thereafter the treated coconut is dried in any suitable way to the desired final moisture level.

In the above procedure, difficulty is sometimes encountered in controlling the exact amount of glycol incorporated in the coconut because during the heating step there is a tendency for some of the glycol to be evolved. For this reason it is usually preferred to mix the coconut, water, salt, and if desired, sugar in the revolving kettle without the addition of glycol and thereafter to remove this product and dry it to a moisture content below that which is desired in the final product. The dried product is then placed in similar revolving kettles along with an appropriate amount of glycol and water and thoroughly mixed without heating. The quantity of water added with the glycol should be such as to raise the moisture content of the final product to the desired value.

The following specific examples show the removal of carbonyl-containing impurities by various methods:

*Example 1.*—One gallon of commercial propylene glycol containing 78 p. p. m. of carbonyl-containing impurities was subjected to vacuum distillation using a fractionating column at a reduced pressure of about 13 mm. pressure. The head temperature was maintained at about 90° C. A fraction amounting to about 30% of the starting material was collected. This fraction contained about 90% of the impurities. The remaining 70% fraction was found to contain only about 8 p. p. m. of carbonyl-containing impurities.

*Example 2.*—One hundred and fifty grams of propylene glycol containing 185 p. p. m. of aldehydes was heated with 7.5 g. of KOH at 140° C. for 20 hours. Thereafter, the resulting mixture was subjected to distillation at 13 mm. pressure and 77% of the starting material was collected using a water cooled condenser. This fraction was found to contain only 9.5% of the original aldehydes.

*Example 3.*—Sulphur dioxide gas was bubbled through 400 pounds of propylene glycol until it contained 0.72 pound of sulphur dioxide. When 2,4-dinitrophenylhydrazine was used to determine the reduction in carbonyl-containing impurities thus effected, the complex formed between the sulphur dioxide and carbonyl-containing materials was apparently broken up and the impurities liberated because analysis showed no appreciable reduction in the amount of such impurities. However, the effective removal of carbonyl-containing impurities by this method is shown by the fact that coconut to which the $SO_2$-treated glycol is added can be stored without objectionable discoloration for substantially longer periods than coconut to which untreated glycol is added.

*Example 4.*—Two hundred grams of propylene glycol containing 27.6 p. p. m. of aldehydes was passed through a column of alumina. A 10% fraction of the material passed through the column was analyzed and found to contain only 10.4 p. p. m. of aldehydes, although the alumina used in the test was not completely anhydrous. As indicated above, still better results are obtained with anhydrous alumina.

*Example 5.*—Two hundred grams of propylene glycol containing 185 p. p. m. of aldehydes was first passed through a column containing a polyphenol resin, and thereafter through a second column containing a polyamine resin. As the glycol passed through the second column it was collected in four fractions, each amounting to 25% of the total starting material. Analysis of the first fraction was omitted because such fraction contained a relatively large percentage of water which had been used to pretreat the ion exchange resin and which water presented difficulties in carrying out the analytical procedure. Analyses of the remaining fractions showed the following:

| Fraction | Aldehydes, p. p. m. |
| --- | --- |
| Second 25% | 6.9 |
| Third 25% | 9.4 |
| Fourth 25% | 10.0 |

Coconut treated with propylene or butylene glycol purified by the above methods has a substantially longer storage life without discoloration than coconut treated with unpurified glycol. For example, coconut containing about 8% moisture was treated with 3% propylene glycol which had been purified by the method of Example 3. It was found that this product could easily be stored at room temperature for 6 months without appreciable yellowing, whereas coconut treated under similar conditions with regular commercial propylene glycol was found to be objectionally discolored within 3 months. Similarly, coconut treated with propylene glycol purified by other methods was found to have a storage life much greater than that of coconut treated with regular commercial propylene glycol.

It is to be understood that the foregoing examples are given by way of illustrating the principles of our invention and are not intended to define the scope thereof, reference being had for that purpose to the appended claims.

References in the appended claims to the removal of carbonyl-containing impurities are meant to include the effective removal of such impurities, as by the formation of a complex or otherwise, as well as their actual separation from the glycol.

What is claimed is:

1. A process for preparing coconut which is tender and resistant to microbiological spoilage which comprises removing carbonyl-containing impurities from a humectant selected from the group consisting of propylene glycol and butylene glycol, and adding said purified humectant to the coconut whereby undesirable yellowing of the coconut is prevented.

2. A process according to claim 1 wherein said carbonyl-containing impurities are removed from said humectant by fractional distillation under reduced pressure.

3. A process according to claim 1 wherein said carbonyl-containing impurities are effectively removed from said humectant by adding sulphur dioxide thereto.

4. A process according to claim 1 wherein said carbonyl-containing impurities are removed from said humectant by contact with alumina.

5. A process according to claim 1 wherein said carbonyl-containing impurities are removed from said humectant by contact with an ion exchange resin.

6. A process according to claim 1 wherein said carbonyl-containing impurities are removed from said humectant by addition of a strong, non-volatile alkali followed by distillation.

7. In the process of preparing coconut which is tender and resistant to microbiological spoilage wherein a humectant selected from the group consisting of propylene glycol and butylene glycol and containing carbonyl-containing impurities is added to the coconut, the improvement which comprises adding the humectant substantially free of carbonyl-containing impurities to the coconut, whereby undesirable yellowing of the coconut is prevented.

8. Coconut which is tender and resistant to microbiological spoilage, said coconut containing 5% to 15% moisture and a humectant substantially free of carbonyl-containing impurities which humectant is selected from the group consisting of propylene glycol and butylene glycol and normally contains substantial amounts of carbonyl-containing impurities.

CHARLES W. KAUFMAN.
CHARLES B. DE MAYA.

REFERENCES CITED

The following references are of record in the file of this patent:

UNITED STATES PATENTS

| Number | Name | Date |
| --- | --- | --- |
| 2,338,184 | Kaufman | Jan. 4, 1944 |